Nov. 26, 1929. S. MÜNCH 1,736,832
MANUFACTURE OF ARTICLES FROM MOLTEN CARBON
Filed Feb. 24, 1926
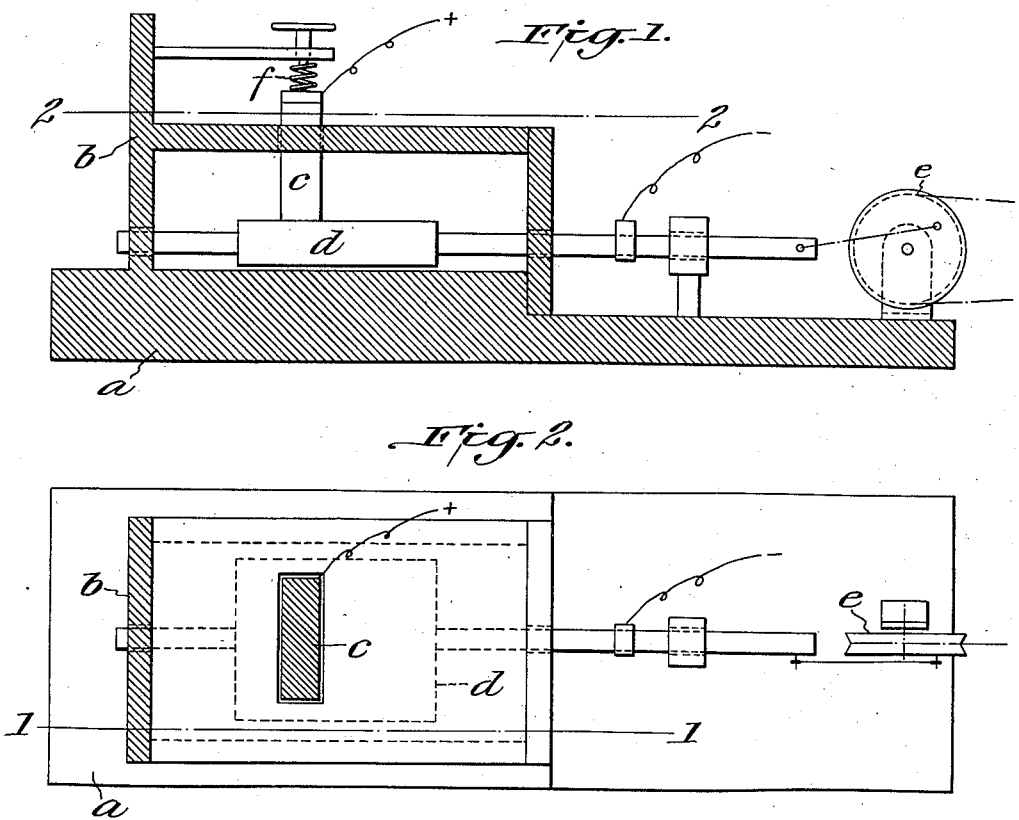

Patented Nov. 26, 1929

1,736,832

UNITED STATES PATENT OFFICE

SIEGMAR MÜNCH, OF WOLFEN, KREIS BITTERFELD, GERMANY, ASSIGNOR TO I. G. FARBENINDUSTRIE AKTIENGESELLSCHAFT, OF FRANKFORT, GERMANY

MANUFACTURE OF ARTICLES FROM MOLTEN CARBON

Application filed February 24, 1926, Serial No. 90,426, and in Germany June 30, 1925.

It is known that carbon can be melted by conducting an electric current through two carbons held in constant contact by means of pressure. In order to make castings in this manner it would be necessary to surround the place where the carbon melts by a mould in which the molten carbon would flow.

By the present invention plates, rods, tubes and other shapes may be made from molten carbon by moving in a suitable manner relatively to each other the electrode which is undergoing fusion and the plate forming the counter electrode, preferably while contact is continuously maintained.

Owing to the extraordinary high fusion point of carbon the molten carbon solidifies under suitable conditions so rapidly that the electrode undergoing fusion can always be moved from a new place of contact on to one which has already been traversed and is covered with solidified carbon or carbon which is still viscid. Thus new layers of carbon are built up on the plate forming the counter electrode and in this manner articles of a desired shape may be made directly.

It is obvious that several electrodes undergoing fusion can be used simultaneously. It is also a matter of indifference whether the electrode undergoing fusion or the counter electrode or both are subject to movement. The process can be conducted with carbons of various origin and properties and at atmospheric or super-atmospheric pressure, whether in a closed chamber or in one through which a suitable gas is flowing. Articles made from fused carbon are useful in chemical and electrical industries.

One method by which articles may be formed in accordance with this invention will be readily apparent from the accompanying drawing of which Fig. 1 represents a vertical section taken on the line 1—1 of Fig. 2 and Fig. 2 represents a horizontal section taken on the line 2—2 of Fig. 1.

On a refractory foundation plate $a$ is mounted a box $b$ which is also made of refractory material. A carbon electrode $c$ projects into the box $b$ through an opening in its top. This electrode is pressed against the movable carbon electrode $d$ by means of an adjustable spring $f$ and is connected to the positive pole of a direct current generator. The movement of the electrode $d$ is accomplished by means of the eccentric pulley mechanism $e$. The pressure with which the electrode $c$ presses against the electrode $d$ is such that continuous contact is maintained and varies with the current strength and voltage.

The operation of the apparatus is obvious from a glance at the drawing. When the circuit is closed, the current causes the electrode $c$ to melt slowly. The molten carbon, which consists of graphite, is spread out on the electrode plate $d$ by the movement of this electrode and on solidification builds up a new carbon body in the form of a plate.

The resulting graphite is chemically pure even when it results from a carbon of high ash content. It is of a foliated structure, the laminæ of which adhere together very wall. It has a weak metallic luster, a high electric conductivity and is of low porosity.

What I claim is:—

1. A process for the production of fabricated articles from molten carbon, which comprises melting carbon by passing electric current through a pair of carbon electrodes while in continuous contact, and coating the surface of one of said electrodes with the molten carbon so formed by relatively moving the electrodes.

2. As a new article of manufacture adaptable for use in chemical and electrical industries, a fabricated carbon article of foliated structure composed of a plurality of adhering layers of graphitic carbon, said article being produced by passing electric current through a pair of carbon electrodes while in continuous contact and coating the surface of one of said electrodes with the molten carbon so formed by relatively moving the electrodes.

In testimony whereof I affix my signature.

SIEGMAR MÜNCH.